Jan. 13, 1953  A. NIKKEL  2,625,092
IRRIGATION BORDER DAM FORMING MACHINE
Filed Dec. 29, 1949  3 Sheets-Sheet 3

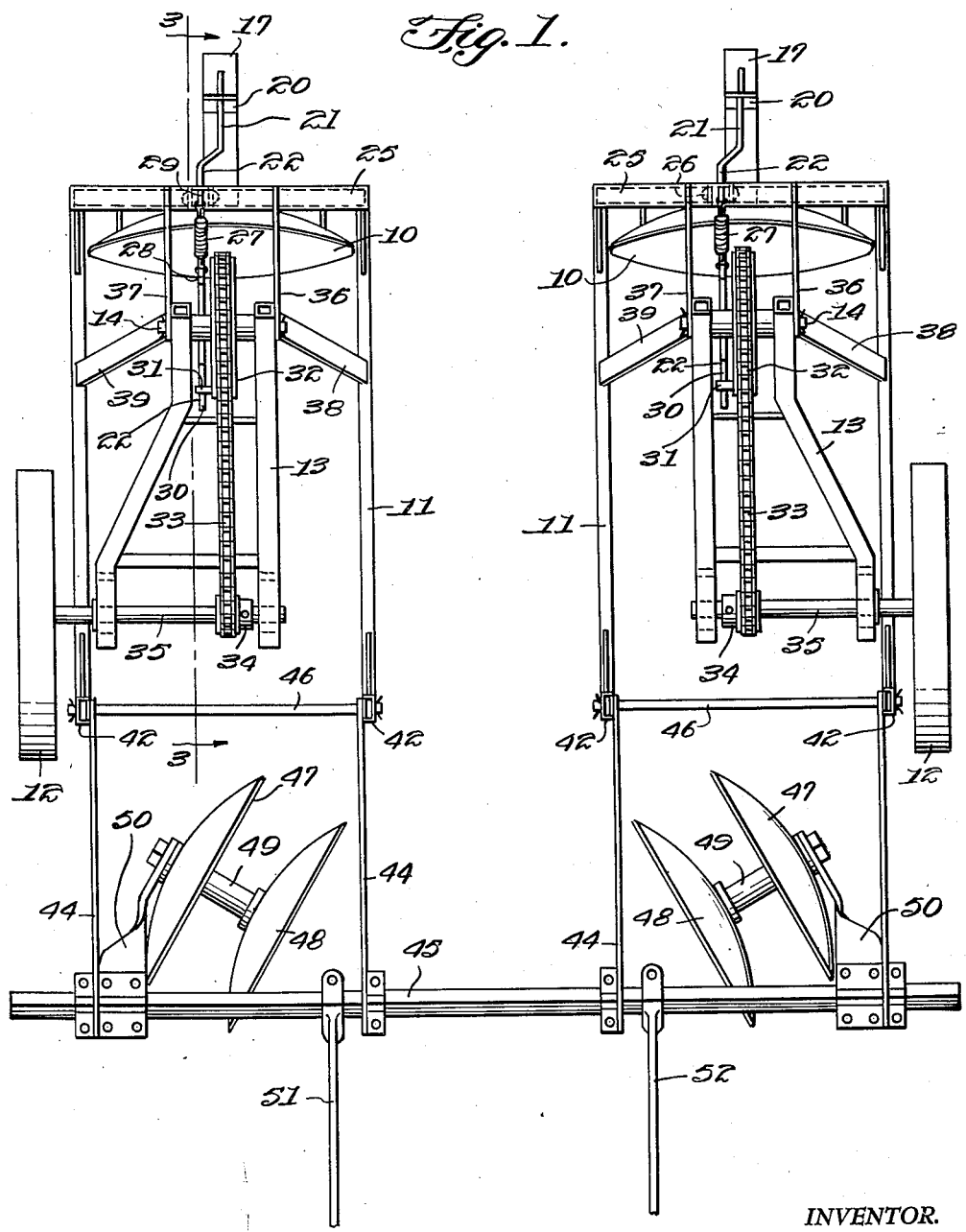

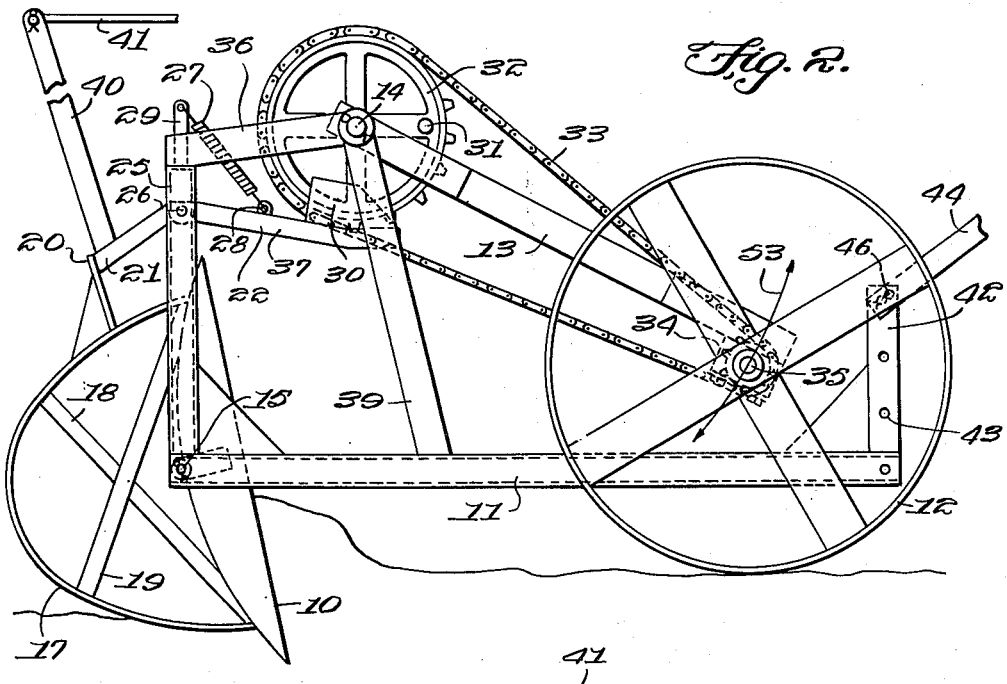

INVENTOR.
ALBERT NIKKEL
BY Victor J. Evans & Co.
ATTORNEYS

Patented Jan. 13, 1953

2,625,092

UNITED STATES PATENT OFFICE 2,625,092

IRRIGATION BORDER DAM FORMING MACHINE

Albert Nikkel, Shafter, Calif.

Application December 29, 1949, Serial No. 135,584

2 Claims. (Cl. 97—55)

1

This invention relates to irrigating devices particularly where it is desired to moisten soil before planting which is commonly known as pre-irrigation, and in particular the invention relates to an attachment for a furrow or ridge making implement which scoops up the soil and forms dams at regular intervals to facilitate spreading water over an area between borders or ridges.

The purpose of this invention is to provide an automatically operating device that follows a furrow or ridge making implement which forms dams at regular intervals in the furrow inside of the ridge or border for holding and spreading water to facilitate penetration of the water into the soil.

In many sections of the country it is mandatory that farm land be pre-irrigated or saturated with water before crops are planted and in order to accomplish this borders are made with special furrow or ridge making implements and these borders which are around two feet wide and one foot high form ribbons of soil which extend in parallel relation across a field. Water is supplied to the areas between these borders, however, it is difficult to control the flow of water and consequently in some areas the soil is not thoroughly saturated and the depth of penetration of the water is not sufficient.

In order to control this flow of water it is the practice to hand shovel dams adjacent the border and thereby slow down the flow of the water, and in some cases completely filling areas between the border. By this method equal penetration of the water is obtained and consequently the soil is in better condition for planting.

With this thought in mind this invention contemplates an attachment adapted to be attached to and positioned to follow a furrow or ridge forming implement that scoops up and automatically dumps and packs sufficient soil to form a dam at regular intervals just inside of the border whereby the flow of water through the furrow formed inside of the border is arrested, at least temporarily and the water is given an opportunity to penetrate the soil.

The object of this invention is, therefore, to provide an automatically operating dam forming attachment for furrow or ridge making implements.

Another object of the invention is to provide a dam forming attachment for furrow forming implements that operates automatically and that may be manually adjusted to an inoperative position for crossing borders, ridges and the like.

A further object of the invention is to provide

2 a dam forming attachment for furrow or ridge forming implements that operates automatically to form dams at spaced intervals in a furrow inside of the border which is of a comparatively simple and economical construction.

With these and other objects and advantages in view the invention embodies an attachment for furrow forming implements having a traction wheel with a scoop pivotally mounted in a frame and means for actuating the scoop at regular intervals to dump and pack soil for forming dams.

Other features and advantages of the invention will appear from the following description taken in connection with the drawings wherein:

Figure 1 is a plan view showing a pair of the dam forming attachments attached to a ridge forming implement.

Figure 2 is a side elevational view of the dam forming attachment showing the scoop in the operative position.

Figure 3 is a similar view taken on line 3—3 of Figure 1 showing the scoop in the dumping or packing position.

Figure 4:
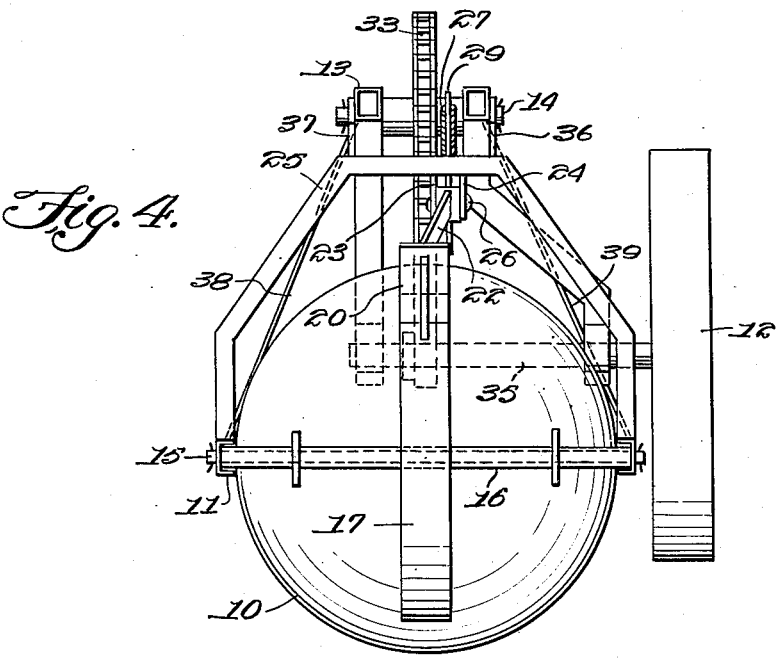
Figure 4 is an end elevational view looking toward the rear end of the attachment.
Figure 5:
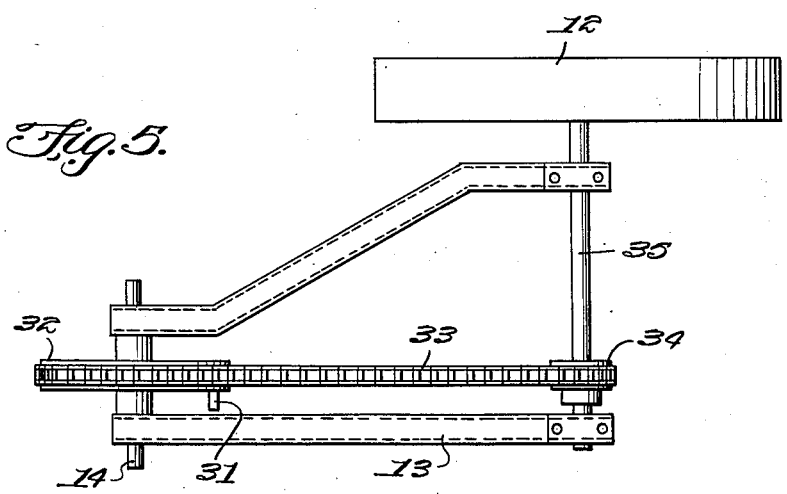
Figure 5 is a plan view showing the auxiliary frame and trip assembly in which the traction wheel is carried.

Referring now to the drawings wherein like reference characters denote corresponding parts the pre-irrigation furrow dam forming machine of this invention includes an arcuate scoop 10 pivotally mounted in a main frame 11 with the scoop actuated by a traction wheel 12 carried by an auxiliary frame 13 and in which the auxiliary frame is pivotally mounted on the main frame 11 through an axle 14.

The scoop 10 is circular and the intermediate part thereof extends rearwardly as shown in Figure 3. The scoop is pivotally mounted on a shaft 15 which extends through a sleeve 16, as shown in Figure 4 and the ends of the shaft are held in the side beams of the main frame 11. The scoop 10 is provided with an arcuate band 17 forming a shoe and the band is supported by braces 18 and 19. One side of the band 17 is provided with a stop 20, that is positioned to engage an end 21 of a trip lever 22 that is pivotally mounted between plates 23 and 24, which extend downwardly from a cross beam of a yoke 25. The trip lever is positioned on a bolt 26 that extends through the plates 23 and 24. The trip lever is resiliently held in the position of engaging the stop 20 by a spring 27, one end of which is attached to an eye 28 on the trip lever, and the other to an extension 29 on the upper surface of the yoke 25.

The outer end of the trip lever 22 is provided with a cam 30 that is positioned to be engaged by a pin 31 on a sprocket 32 that is journaled on the axle 14 and driven by a chain 33 from a sprocket 34 on the shaft 35 by which the traction wheel 12 is journaled in the auxiliary frame 13.

With the parts arranged in this manner the traction wheel rotates the sprocket 32 through the chain 33 and with each revolution of the sprocket wheel the pin 31 engages the cam 30 moving this end of the trip lever 22 downwardly and the opposite end upwardly whereby the stop 20 which, as illustrated in Figure 2, engages the end 21 of the trip lever, is released and the weight of the dirt bearing against the lower end of the scoop turns the scoop completely over so that the scoop packs the soil and continues to rotate through 360° at which time the stop 20 again engages the end 21 of the trip lever 22, the cam 30 having been released by the pin 31 moving upwardly, and the lever being returned by the spring 27.

The axle 14 is journaled in bars 36 and 37 that extend forwardly from the yoke 25. The forward ends of the bars are supported by braces 38 and 39, respectively.

The end 21 of the trip lever 22 is provided with an upwardly extended arm 40 to which a rod or cable 41 may be attached and when it is desired to release the scoop 10 to facilitate transporting the attachment over a ridge, border, or the like the trip is held upwardly by the rod or cable 41 so that the scoop assumes the position illustrated in Figure 3.

As illustrated in the drawings the side beams of the main frame 11 are provided with upwardly extended struts 42 which are positioned on the forward ends thereof and the struts are provided with spaced bolt holes or openings 43 through which the forward end of the main frame may be attached to bars 44 extended from the shaft 45 of a furrow or ridge forming implement. The struts 42 are attached to the end of the bars 44 by rods 46 and the border or ridge forming implement is provided with discs 47 and 48 which are mounted on a shaft 49 in a bracket 50 carried by the shaft 45. The shaft 45 may be held by forwardly extended arms 51 and 52, as shown in Figure 1.

The two attachments, illustrated in Figure 1, are similar and the same reference characters are applied to both.

With the parts formed in this manner the attachment is connected to a furrow or ridge forming implement so that the scoop 10 follows the furrow forming element and with the stop 20 held by the end 21 of the trip lever 22 the scoop plows through the soil, accumulating soil therein, and at regular intervals, the pin 31 trips the scoop so that it turns over dumping the soil therein and at the same time packing the soil forming a dam. The scoop continues to rotate until stop 20 is again engaged by the end 21 of the trip lever.

The distance between the dams is determined by the ratio between the sprockets 32 and 34.

The forward end of the auxiliary frame 13 is free to swing about the axle 14 so that the traction wheels 12 follow the contour of the soil, swinging upwardly and downwardly as indicated by the arrow 53, as shown in Figure 2.

It will be understood that modifications may be made in the design and arrangement of the parts without departing from the spirit of the invention.

What is claimed is:

1. A dam forming attachment for furrow and border forming implements comprising a main frame, means for attaching the main frame to an implement, a scoop pivotally mounted in the main frame and positioned to scoop soil as the implement travels, said scoop having an arcuate shoe on the back thereof, a stop extended outwardly from the shoe of the scoop, a trip lever positioned to engage the stop on the shoe of the scoop, said trip lever having a cam on the end thereof, a sprocket journaled in the said main frame having a pin eccentrically positioned thereon and positioned to engage the cam of the trip lever for actuating the trip lever to release the stop of the shoe of the scoop, an auxiliary frame pivotally mounted in the main frame on the same axis as said sprocket, a traction wheel journaled in the auxiliary frame, and means driving the sprocket having the eccentric pin thereon by the traction wheel of the auxiliary frame.

2. A dam forming attachment for furrow and border forming implements comprising a main frame, means for attaching the main frame to the implement, a scoop pivotally mounted in the main frame and positioned to scoop soil as the implement travels, said scoop having an arcuate shoe on the back thereof, a stop extended outwardly from the shoe of the scoop, a trip lever positioned to engage the stop on the shoe of the scoop, said trip lever having a cam on the end thereof, a sprocket journaled in the said main frame having a pin eccentrically positioned thereon and positioned to engage the cam of the trip lever for actuating the trip lever to release the stop of the shoe of the scoop, an auxiliary frame pivotally mounted in the main frame on the same axis as said sprocket, a traction wheel journaled in the auxiliary frame, means driving the sprocket having the eccentric pin thereon by the traction wheel of the auxiliary frame, and an arm extended from said trip lever for actuating the trip lever manually to release the stop of the scoop.

AL NIKKEL.

REFERENCES CITED

The following references are of record in the file of this patent:

UNITED STATES PATENTS

| Number | Name | Date |
|---|---|---|
| Re. 21,675 | Peacock | Dec. 24, 1940 |
| 2,044,304 | James | June 16, 1936 |
| 2,057,407 | Allison et al. | Oct. 13, 1936 |
| 2,227,151 | Orelind | Dec. 31, 1940 |
| 2,236,832 | Nielson | Apr. 1, 1941 |
| 2,308,536 | Peacock | Jan. 19, 1943 |